US009133428B2

(12) United States Patent
Beck et al.

(10) Patent No.: US 9,133,428 B2
(45) Date of Patent: Sep. 15, 2015

(54) WINE DEGASSING METHOD AND APPARATUS

(71) Applicants: Guy L. Beck, Lawrenceville, GA (US); Nicholas Thompson, Atlanta, GA (US)

(72) Inventors: Guy L. Beck, Lawrenceville, GA (US); Nicholas Thompson, Atlanta, GA (US)

(73) Assignee: BWT Licensing, LLC, Lawrenceville, GA (US)

(*) Notice: Subject to any disclaimer, the term of this patent is extended or adjusted under 35 U.S.C. 154(b) by 261 days.

(21) Appl. No.: 13/781,882

(22) Filed: Mar. 1, 2013

(65) Prior Publication Data

US 2014/0154383 A1 Jun. 5, 2014

Related U.S. Application Data

(60) Provisional application No. 61/640,117, filed on Apr. 30, 2012, provisional application No. 61/650,671, filed on May 23, 2012.

(51) Int. Cl.
*C12G 3/06* (2006.01)
*C12H 1/14* (2006.01)
*C12G 1/036* (2006.01)

(52) U.S. Cl.
CPC ............. *C12H 1/14* (2013.01); *C12G 1/0206* (2013.01)

(58) Field of Classification Search
CPC ........... C12G 1/00; C12G 1/0206; C12H 1/14
USPC ............. 99/277.1, 277.2, 323.1, 345, 472; 215/232, 311, 364; 222/152, 401
See application file for complete search history.

(56) References Cited

U.S. PATENT DOCUMENTS

| 2,021,368 | A | * | 11/1935 | Louis | 62/306 |
| 2,060,512 | A | * | 11/1936 | Magill | 222/400.8 |
| 4,395,940 | A | * | 8/1983 | Child et al. | 99/323.1 |
| 4,399,081 | A | * | 8/1983 | Mabb | 261/121.1 |
| 4,595,121 | A | * | 6/1986 | Schultz | 222/1 |
| 4,691,842 | A | * | 9/1987 | Foures | 222/1 |
| 4,702,396 | A | * | 10/1987 | Gwiazda | 222/152 |
| 4,785,724 | A | * | 11/1988 | Vassallo | 99/323.1 |
| 4,856,680 | A | * | 8/1989 | Sitton | 222/152 |
| 4,984,711 | A | * | 1/1991 | Ellis | 222/82 |
| 5,139,179 | A | * | 8/1992 | Cecil | 222/399 |
| 5,778,763 | A | * | 7/1998 | Ford, Sr. | 99/277.2 |
| 6,457,495 | B1 | * | 10/2002 | Meheen | 141/40 |
| 6,508,163 | B1 | * | 1/2003 | Weatherill | 99/323.1 |
| 6,854,246 | B2 | * | 2/2005 | Savage et al. | 53/449 |
| 6,886,605 | B2 | * | 5/2005 | Luis | 141/8 |
| 7,165,581 | B2 | * | 1/2007 | Chantalat | 141/64 |
| 7,810,679 | B2 | * | 10/2010 | Wauters et al. | 222/399 |

(Continued)

OTHER PUBLICATIONS

Photocopy of Samuel Adams Boston Lager coaster, The Boston Beer Company, Boston, MA.

*Primary Examiner* — Thien S Tran
(74) *Attorney, Agent, or Firm* — Thomas/Horstemeyer, LLP

(57) ABSTRACT

A wine degassing apparatus 20 is mounted to the neck opening of a wine bottle and includes a gas separator rod 22 formed of cordierite or other suitable inert material with an exterior shape that causes nucleation of carbon dioxide from the wine. The gas separator rod is supported by a rod holder 23 having a mounting socket 35 at the upper end of the rod, and the mounting socket is inserted into the pump adapter plug 24 with air passages 40 formed between the mounting socket 35 and the plug so that the vacuum pump can pull gas from the bottle neck 18 up through the mounting socket 35 and pump adapter plug 24.

9 Claims, 4 Drawing Sheets

(56) References Cited

U.S. PATENT DOCUMENTS

| | | |
|---|---|---|
| 7,837,769 B2 | 11/2010 | Lahr |
| 2006/0081554 A1* | 4/2006 | Snyder .......................... 215/364 |
| 2006/0081657 A1* | 4/2006 | Bonner .......................... 222/401 |
| 2007/0119875 A1* | 5/2007 | Ehret et al. .................. 222/386.5 |
| 2009/0274793 A1 | 11/2009 | Schroeder |
| 2010/0006603 A1* | 1/2010 | Weinberg et al. ............. 222/152 |
| 2010/0043917 A1* | 2/2010 | Kitchener et al. .............. 141/65 |
| 2010/0058933 A1* | 3/2010 | Cheng .......................... 99/323.1 |
| 2010/0183788 A1* | 7/2010 | Dulst ............................ 426/404 |
| 2011/0042418 A1* | 2/2011 | Lambrecht .................... 222/152 |
| 2011/0163094 A1* | 7/2011 | Arney .......................... 220/212 |
| 2011/0204093 A1* | 8/2011 | Lee .............................. 222/152 |
| 2013/0008921 A1* | 1/2013 | Poggio ......................... 222/152 |
| 2013/0129888 A1* | 5/2013 | Kornacki ..................... 426/487 |
| 2013/0306673 A1* | 11/2013 | Manera .......................... 222/82 |
| 2014/0263453 A1* | 9/2014 | Haley et al. .................. 222/152 |

* cited by examiner

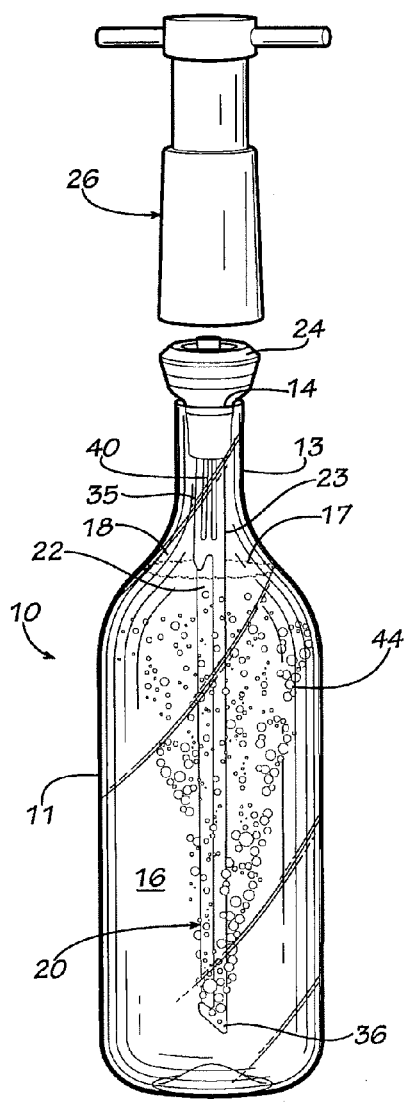 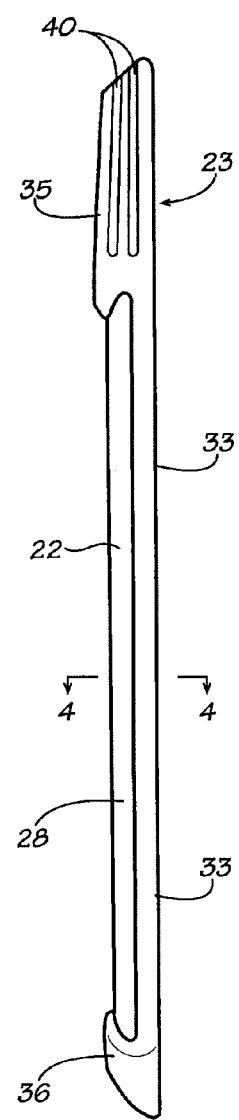
FIG. 1      FIG. 2

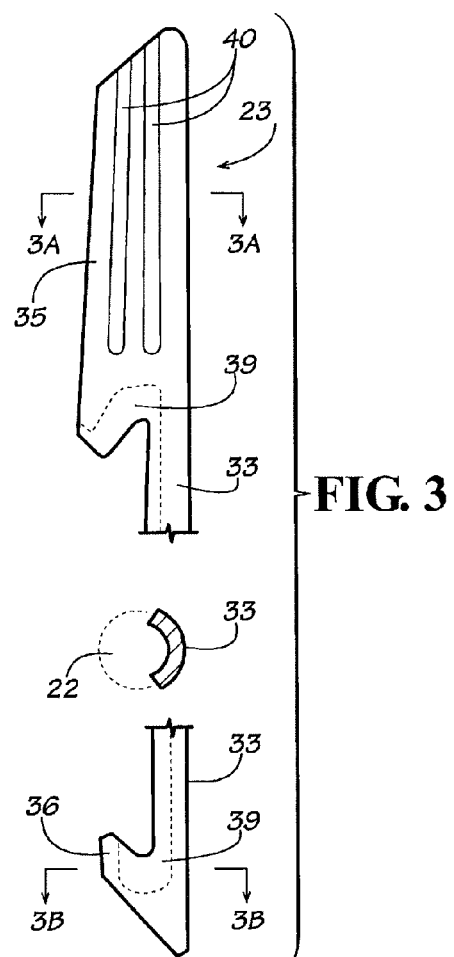
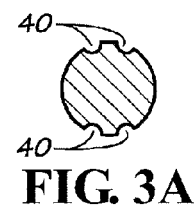
FIG. 3A
FIG. 3B
FIG. 3
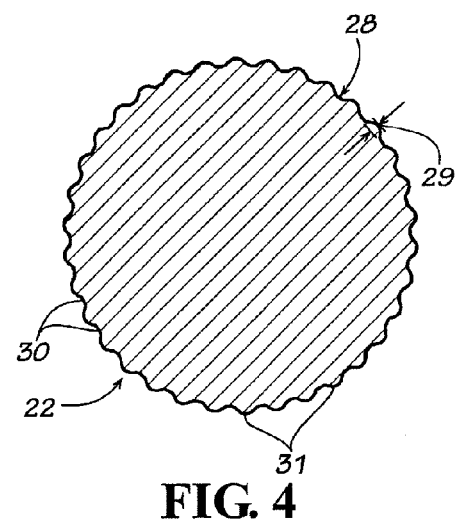
FIG. 4

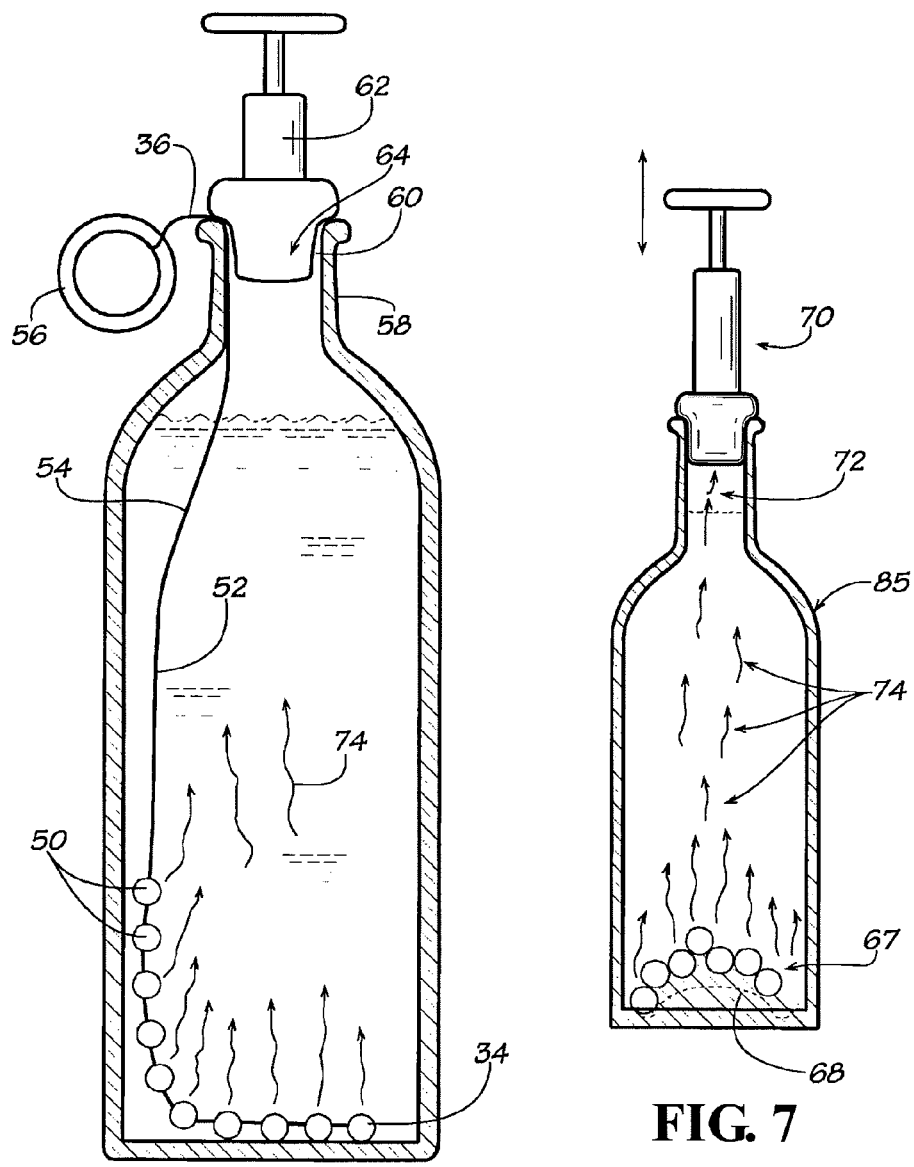

WINE DEGASSING METHOD AND APPARATUS

CROSS REFERENCE TO RELATED APPLICATIONS

Applicants claim priority and the benefit of U.S. Provisional Patent Application 61/640,117 filed Apr. 30, 2012, entitled Wine Degassing Process and U.S. Provisional Patent application 61/650,671 filed May 23, 2012, entitled Wine Degassing Process and Degassing Elements.

BACKGROUND OF THE INVENTION

In the production of wine, large amounts of carbon dioxide and other gasses are formed in and absorbed by the wine solution during fermentation and leave a rather bitter taste in the wine. Carbon dioxide is a colorless gas produced during the fermentation and wine makers store the wine in carboys, barrels, and other containers to allow the carbon dioxide to escape from the liquid of the wine. The longer period of aging the wine generally develops a softer tasting wine. The aging process generally results in improving the quality of the wine and increasing the value of the wine.

Amateur wine makers have resorted to the use of stirring equipment to agitate the wine to cause foam and some carbon dioxide to be formed on the surface of the wine, thereby driving away some of the carbon dioxide and, therefore, enhancing the taste of the wine. Others have used the application of a vacuum pump to the container of the wine, such as in the typical wine bottle, for the same purpose, to apply a low air pressure inside the bottle and to the wine, inducing the carbon dioxide and other gasses to separate from the liquid of the wine.

While all of the above procedures have been successful to some extent, there still is a demand for wine that does not contain undesirable amounts of carbon dioxide and other gasses that affect the taste of the wine.

Accordingly, it would be desirable to have a convenient and expedient means for the consumer to be able to reduce the carbon dioxide and other gasses contained in bottled wine.

SUMMARY OF THE INVENTION

Briefly described, this disclosure teaches a method and apparatus that may be used by the consumer for reducing the amount of carbon dioxide and other gasses contained in bottled wine, thereby enhancing the taste of the wine and providing the consumer with control of the gas reduction process for different wines. The gas removal usually results in changes in the wine, such as in the aroma, mouth feel, taste, and finish of the wine.

By use of this process, the degassing of the wine may be achieved faster than it normally would be when using a standard method recommended by manufacturers of homemade wine kits. It is possible that in the situation of degassing a 750 ml. bottle of homemade or commercial wine, the degassing process disclosed herein will take approximately one minute when using approximately 20 one-half inch diameter ceramic balls as shown in FIGS. 6 and 7 of an exterior texture equivalent to above 200-600 grit sandpaper, in conjunction with a vacuum between 400 and 600 millimeters HG. A shorter time may be required for the degassing process performed by the embodiment of the invention shown in FIGS. 1-5, apparently because of the more vertical surface area provided by the elongated gas separator rod 22 and the multiple corrugations formed on the surface of the gas separator rod. When the size, shape, density or surface texture of the inert material of the gas separator material is changed, there is a likelihood that the vacuum pressure and/or time of application of the vacuum pressure may be changed.

The process of degassing bottled wine as disclosed herein may include the steps of inserting a solid item having a rough exterior surface formed of cordierite or other inert material into a container partially filled with wine to a level below the surface of the wine in the container, closing the container from the atmosphere, and applying a subatmospheric pressure to the interior of the container. The pressure drawn in the wine causes nucleation of carbon dioxide in the wine at the rough exterior surface formed on a solid inert item such as a cordierite item. The solid inert item having the rough exterior surface may have a shape selected from the group consisting of a solid rectilinear cylindrical shaft with a rough, granular or corrugated external surface. The solid inert item may comprise members attached in series on a connecting cord or rounded solid shapes.

The process to be practiced as disclosed herein may include the steps of inserting a solid rectilinear rod having a rough surface texture, preferably formed of cordierite, into a bottle of wine or other container that is partially filled with the wine to a level below the surface of the wine, supporting the rod with an adapter plug at the opening of the bottle or container of wine so that the adapter plug suspends the cordierite rod in the wine in vertical orientation, and then withdrawing gas from the bottle or container through the adapter plug. This creates a pressure in the container below atmospheric pressure, thereby inducing nucleation of the carbon dioxide in the wine at the surface of the cordierite rod.

Another form of the invention is the holder for the cordierite rod that attaches to opposite ends of the rod and exposes a major portion of both the length and circumference of the rod to the wine in the container or bottle, making available a large portion of the cordierite rod to contact with the wine in the container or bottle.

Another feature of the invention is the use of a solid inert material having a coarse exterior surface of a size and shape suitable for inserting into a bottle of wine, coupled with a vacuum pump for reducing the pressure of the atmosphere within the bottle/container to a level that induces nucleation of carbon dioxide in the wine in contact with the insert, with bubbles of carbon dioxide formed that rise to the level of the liquid, above the wine in the bottle.

Other objects, features, and advantages of this invention will become apparent upon reading the following specification when taken in conjunction with the accompanying drawings.

BRIEF DESCRIPTION OF THE DRAWINGS

FIG. 1 is a side view of a bottle partially filled with wine, a pump adapter plug inserted into the opening of the neck of the wine bottle, and a vacuum pump suspended in alignment with the pump adapter plug, and a gas separation rod and its holder suspended from the pump adapter plug down into the wine contained in the bottle.

FIG. 2 is a side view of the gas separation rod and its holder.

FIG. 3 is a side view of the rod holder, with portions thereof shown in cross section.

FIG. 3A is a cross section of the rod holder of FIG. 3, taken along lines 3A-3A of FIG. 3.

FIG. 3B is a cross section of the rod holder of FIG. 3, taken along lines 3B-3B of FIG. 3.

FIG. 4 is an enlarged cross section of the gas separation rod.

FIG. 6 is a side cross sectional view of a second embodiment of the invention, showing gas separator beads strung on a line in a bottle.

FIG. 7 is a side cross sectional view of a third embodiment of the invention, showing gas separator beads in a bottle.

DETAILED DESCRIPTION

Figure 5:
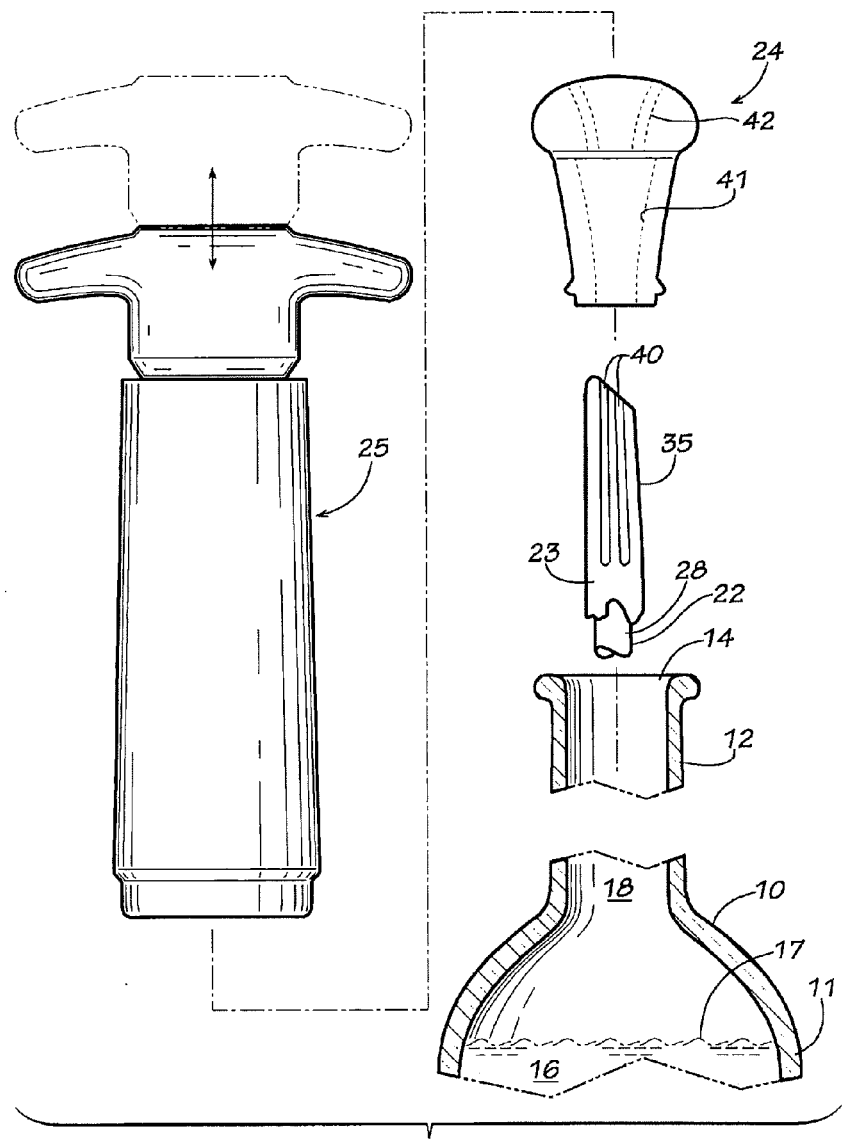
FIG. 5 is an expanded side view of the segments of the pump adapter plug, gas separation rod and its holder, and the neck of a wine bottle showing how these elements fit together, and the vacuum pump.

Referring now in more detail to the drawings in which like numerals indicate like parts throughout the several views, FIG. 1 illustrates a wine bottle 10 having an internal space for containing 750 ml. of wine, of conventional shape, including a cylindrical side wall 11, a recessed bottom wall 12, bottle neck 13, and bottle opening 14 at the top of bottle neck 13. The bottle illustrated in FIG. 1 contains wine 16 with the surface 17 of the wine leaving a gas space 18 at the neck 13. The cork or cap that usually closes the bottle opening 14 has been removed and replaced with the wine degassing apparatus 20.

In the embodiment illustrated in FIGS. 1-5, the wine degassing apparatus 20 includes a gas separator rod 22, rod holder 23, and pump adapter plug 24. A conventional vacuum pump 26 has a bottom open end that is sized and shaped to mate with the upper portion of the pump adapter plug 24, sealing the two together so that the vacuum pump 26 can draw air/gas upwardly through the pump adapter plug 24. Vacuum pump 26 is conventional and is considered to be prior art.

As illustrated in FIGS. 2 and 4, gas separator rod 22 is rectilinear, having a generally cylindrical exterior surface but including an irregular surface 28. One such irregular surface may be a corrugated surface having longitudinal grooves 30 at approximately 0.0075 inches deep at a radius of 0.0075 to form protrusions 31. The grooves and protrusions extend longitudinally of the gas separator rod 22 and help in the process of separating carbon dioxide from the wine in response to a low pressure atmosphere within the bottle of wine.

While the corrugations of FIG. 4 extend longitudinally of the gas separator rod 22, other irregular surfaces may be used, such as a plurality of circular protrusions spaced along the length of the gas separator rod, or a grainy texture at the surface of the gas separator rod.

FIG. 3 illustrates the rod holder 23 in more detail. The rod holder includes a stem 33 that is of smaller breadth than the gas separator rod and which is juxtaposed the gas separator rod as shown in FIG. 2. A mounting socket 35 is formed at the upper end of the stem 33 and a retaining socket 36 is mounted to the lower end of the elongated stem 33. The sockets and the stem 33 are formed of elastomeric material such as Monoprene, forming a unitary piece that is slightly stretchable to receive the gas separator rod.

The mounting socket 35 and the retaining socket 36 both include internal recesses, such as downwardly facing recess 38 in the lower portion of mounting socket 35 and the upwardly facing recess 39 in the retaining socket 36 so that the end portions of the gas separator rod 22 fit into the recesses 38 and 39, and the gas separator rod 22 is firmly held at its ends to the separator rod holder 23.

As best shown in FIGS. 2 and 3, air passage grooves 40 extend at the surface along the length of mounting socket 35 of separator rod holder 23.

As illustrated in FIG. 5, the pump adapter plug 24 defines an gas chimney 41 that fits about the mounting socket 35, and an upper portion that includes air channels 42 that communicate the gas chimney 41 with the atmosphere so that gas may pass from the gas chimney through the air passage grooves. Since the air passage grooves 40 of the mounting socket 35 extend into the gas chimney 41 of the pump adapter plug, there is a passage that extends from the lower portions of the air passage grooves 40 that extend beyond the lower limits of the pump adapter plug 24, making a passage for exhausting gasses from the wine bottle. Therefore, when the vacuum pump 25 is operated, air freely passes from the wine bottle up through the portions of the air passage grooves 40 that protrude down below the pump adapter plug 24, so that gas is drawn upwardly from the bottle by the pump.

When the wine degassing apparatus 20 is to be placed in use, the gas separator rod 22 is mounted in the separator rod holder 23 as illustrated in FIG. 2, and the mounting socket 35 at the upper end of the gas separator rod 22 is moved into the bottom facing opening 41 (FIG. 5) of the pump adapter plug 24 so that the pieces are firmly mounted to one another. The air passage grooves 40 that are formed in the mounting socket 35 allow the passage of air from the wine bottle and through the mounting socket 35 and pump adapter plug 24 into the atmosphere.

Once the wine degassing apparatus is in place, as shown in FIG. 1, the vacuum pump 26 may be applied to the pump adapter plug 24 and the handle portion of the pump reciprocated so as to apply a vacuum to the pump adapter plug. The opening through the pump adapter plug allows gas to be drawn from inside the bottle 30 up through the air passage grooves 40 of the mounting socket 35 of the separator rod holder 23, into the passage through the pump adapter plug 24, and into the vacuum pump 26.

The withdrawal of gas upwardly from the wine bottle 10 applies a subatmospheric pressure inside the bottle, to the surface of the wine. This, in turn, generates a lower pressure in the liquid wine, tending to degas the wine by withdrawing gas that includes carbon dioxide from the liquid, expelling the carbon dioxide to the atmosphere. The carbon dioxide and other gasses are formed in bubbles about the surface of the gas separator rod shown at 44 in FIG. 1.

In a typical situation, the internal pressure of the gas into the wine bottle 10 is reduced to 600 mm Hg, or approximately 600 mm Hg lower than atmospheric pressure. The amount of reduction of pressure inside the bottle is controlled by the user of the invention, and the user of the invention usually will observe the bubbles formed in the wine that surround the gas separator rod 22.

While the irregular surface 28 of the gas separator rod 22 is shown as vertically oriented corrugations, other irregular shapes may be formed on the surface of the gas separator rod 22, such as, but not limited to, a series of circular protrusions or a grainy surface.

FIG. 6 illustrates another wine degasser embodiment that follows similar principles to nucleation of carbon dioxide and other gasses as in the prior version described above. The solid inert items may be formed in the shapes of beads 50 with rough surfaces and that have openings therethrough, and the beads may be strung on a line 52 that passes through the openings in the beads and spacers (not shown) may be used to maintain the beads separated from one another, as shown in FIG. 6.

The line 52 has a distal end 34 and the beads 50 will be positioned adjacent the distal end of the line, and the proximal end 54 of the line 52 is long enough to extend through and out of the neck of the wine bottle. An enlarged object 56, such as a ring, may be attached to the proximal end of the line outside of the bottle to prevent the proximal end of the line from entering the bottle. With this arrangement, the beads 50 may be withdrawn from the bottle without spilling the wine.

The line 52 may be thin enough to allow the line to be extended through the neck 58 of the wine bottle and through the opening 60 of the bottle and the vacuum pump 62 and an adapter 64 mounted on the opening of the wine bottle to form a seal to prevent the passage of atmospheric air through the opening of the bottle. This allows for a snug seal of the opening 60 of the wine bottle, and also allows vacuum pressure to be developed in the bottle by operating the vacuum pump 62. When it is desired to remove the ceramic beads 50 from the bottle, the vacuum pump 62 and adapter 64 are removed from the bottle and the proximal end 54 of the line 52 may be drawn upwardly to lift the ceramic beads 50 out of the bottle. This expedites using the product and cleaning the product.

FIG. 7 illustrates another form of the invention that includes the placement of beads or other spherical items 67 that are not connected to one another into the bottle so that they come to rest on the bottom wall 68 of the bottle. Gas is emitted from the wine in the bottle 65 as described previously by the operation of the vacuum pump, drawing air from the space above the level of the wine, with the gas bubbles indicated at 74 in FIG. 7.

As previously described, the beads 50 of FIG. 6 and the spherical objects 67 of FIG. 7 may be formed of cordierite or other inert material with irregular surfaces.

Cordierite is formed of orthorhombic mineral and is a silicate of magnesium, aluminum, and sometimes iron, and may be found in granites and in metamorphic rocks that form under relatively low pressure conditions. A chemical formula for cordierite is $(MG, FE)_2AL_4SI_5O_{18}$.

The gas separator rod 22 may be between 6 and 9 inches in length for use in wine bottles of conventional size (750 ml.). Other dimensions of the gas separator rod may be used to fit wine bottles of different sizes. It is desirable to submerge as much of the surface of the gas separator rod as practical to expose the maximum amount of surface of the gas separator rod to the wine.

Although preferred embodiments of the invention have been disclosed in detail herein, it will be obvious to those skilled in the art that variations and modifications of the disclosed embodiments can be made without departing from the spirit and scope of the invention as set forth in the following claims.

The invention claimed is:

1. A wine degassing apparatus comprising:
 a gas separation rod formed of cordierite, and having an irregular surface texture extending along the length of said rod,
 a holder configured for supporting said gas separation rod, and
 an adapter plug configured to suspend said holder and said gas separation rod into the wine of a wine bottle.

2. The wine degassing apparatus of claim 1, wherein said irregular surface of said gas separation rod is a corrugated surface extending along the length of said rod.

3. The wine degassing apparatus of claim 1, wherein said holder comprises
 an elongated stem of a size and shape to extend along the length of said gas separation rod,
 a mounting socket at one end of said stem shaped to mate with said adapter plug, and
 a retaining socket at the other end of said stem for receiving the other end of said gas separation rod.

4. The wine degassing apparatus of claim 3, wherein said mounting socket defines grooves that are shaped to extend into said adapter plug and pass air from the interior of a wine bottle through said adapter plug.

5. A wine degassing apparatus comprising: a gas separation rod formed of cordierite,
 a holder configured for supporting said gas separation rod, and
 an adapter plug configured to suspend said holder and said gas separation rod into the wine of a wine bottle.

6. The wine degassing apparatus of claim 5, wherein
 said gas separation rod is formed of cordierite having an irregular surface for assisting the formation of gas bubbles at the surface of the rod in response to the reduction of pressure of wine about the rod.

7. The wine degassing apparatus of claim 6, wherein said irregular surface of said gas separation rod is selected from the shapes consisting of: corrugations extending along the length of said gas separation rod, rings extending about said gas separation rod, and a granular surface.

8. The wine degassing apparatus of claim 5, wherein said holder comprises
 an elongated stem of a size and shape to extend along the length of said gas separation rod,
 a mounting socket at one end of said stem shaped to mate with said adapter plug,
 a retaining socket at the other end of said stem for receiving the other end of said gas separation rod, and
 said mounting socket defines grooves that are shaped to extend into said adapter plug and pass air from the interior of a wine bottle through said adapter plug.

9. The wine degassing apparatus of claim 5, and further including a vacuum pump for withdrawing gas from the wine bottle about a mounting socked and said adapter plug.

* * * * *